United States Patent
Zheng

(10) Patent No.: US 10,038,646 B2
(45) Date of Patent: Jul. 31, 2018

(54) METHOD AND APPARATUS FOR ACQUIRING PORT RANGE RESOURCE, AND METHOD AND APPARATUS FOR ALLOCATING PORT RANGE RESOURCE

(71) Applicant: ZTE Corporation, Shenzhen (CN)

(72) Inventor: Kun Zheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 148 days.

(21) Appl. No.: 15/025,619

(22) PCT Filed: May 23, 2014

(86) PCT No.: PCT/CN2014/078342
§ 371 (c)(1),
(2) Date: Mar. 29, 2016

(87) PCT Pub. No.: WO2014/183701
PCT Pub. Date: Nov. 20, 2014

(65) Prior Publication Data
US 2016/0241489 A1 Aug. 18, 2016

(30) Foreign Application Priority Data
Sep. 29, 2013 (CN) .......................... 2013 1 0455132

(51) Int. Cl.
*G06F 15/173* (2006.01)
*H04L 12/911* (2013.01)
*H04L 29/12* (2006.01)
(52) U.S. Cl.
CPC .......... *H04L 47/82* (2013.01); *H04L 61/2007* (2013.01); *H04L 61/2092* (2013.01); *H04L 61/2575* (2013.01); *H04L 61/6063* (2013.01)
(58) Field of Classification Search
CPC .......... H04L 61/20; H04L 61/25; H04L 61/60
(Continued)

(56) References Cited

U.S. PATENT DOCUMENTS

2005/0060390 A1 3/2005 Vakil et al.
2009/0119770 A1* 5/2009 Soliman .................. H04L 63/20
726/14
(Continued)

FOREIGN PATENT DOCUMENTS

CN 101237603 A 8/2008
CN 102572003 A 7/2012

OTHER PUBLICATIONS

International Search Report for corresponding Application No. PCT/CN2014/078342 filed on May 23, 2014; dated Aug. 4, 2014.
(Continued)

*Primary Examiner* — Glenford Madamba
(74) *Attorney, Agent, or Firm* — Cantor Colburn LLP

(57) ABSTRACT

Provided are a method and apparatus for acquiring a port range resource, and method and apparatus for allocating a port range resource. In the method, a first Router Solicitation (RS) message is sent to a server-end device, wherein information carried in the first RS message includes at least one of an Internet Protocol (IP) address multiplexing request and a port range resource allocation request; and a Router Advertisement (RA) message from the server-end device is received, wherein information carried in the RA message includes: a port range resource allocated according to the IP address multiplexing request and/or according to the port range resource allocation request. By virtue of the technical solution, an Address Plus Port (A+P) technology can be applied to an application scenario where stateless configuration of an Internet Protocol Version 6 (IPv6) address is performed via Neighbour Discovery (ND), thereby expanding the application range of the A+P technology.

12 Claims, 6 Drawing Sheets

A first RS message is sent to a server-end device, wherein information carried in the first RS message includes at least one of an IP address multiplexing request and a port range resource allocation request — S102

An RA message from the server-end device is received, wherein information carried in the RA message includes: a port range resource allocated according to the IP address multiplexing request and/or according to the port range resource allocation request — S104

(58) Field of Classification Search
USPC .......................................................... 709/226
See application file for complete search history.

(56) References Cited

U.S. PATENT DOCUMENTS

| | | | |
|---|---|---|---|
| 2010/0325416 A1* | 12/2010 | Haddad | H04L 63/1458 713/150 |
| 2012/0140719 A1* | 6/2012 | Hui | H04W 76/021 370/329 |
| 2012/0179830 A1* | 7/2012 | Ait-Ameur | H04L 67/34 709/228 |

OTHER PUBLICATIONS

Bush, et al.: The Address Plus Port (A+P) Approach to the IPV4 Address Shortage: RFC6346. TXT, Internet Engineering Task Force, IETF; Standard, Internet Society (ISOC0 4, XP015081275; [Retrieved on Aug. 26, 2011]; pp. 38.
Cheshire Apple Computer B Aboba Microsoft Corporation E Guttman Sun Microsystems S: Dynamic Configuration of IPv4 Link-Local Address; rfc3927.txt:, Network Working Group RFC 1717, Internet Society(ISOC) 4, XP015054862, ISN: 0000-0003; pp. 33.
Marten IBM Nordmark Sun Microsystems W Simpson Daydreamer H Soliman Elevate Technologies T: "Neighbor Discovery for IP Version 6 (IPV6); rfc4861.txt", Network Working Group RFC 1717 Internet Society (ISOC) 4, XP015052407; ISN: 0000-0003; pp. 96.
Supplementary European Search Report Application No. EP14798037; dated Mar. 31, 2017; pp. 7.

* cited by examiner

METHOD AND APPARATUS FOR ACQUIRING PORT RANGE RESOURCE, AND METHOD AND APPARATUS FOR ALLOCATING PORT RANGE RESOURCE

TECHNICAL FIELD

The present disclosure relates to the field of communications, and in particular to a method and apparatus for acquiring a port range resource, and a method and apparatus for allocating a port range resource.

BACKGROUND

Currently, Network Address Translation (NAT) in the related art is one of the Wide Area Network (WAN) access technologies. The NAT is a translation technology for translating a private (reserved) address into a legal Internet Protocol (IP) address, and is widely applied to various types of internet access modes and various types of networks. The NAT can solve the problem of IP address exhaustion.

With the exhaustion of Internet Protocol Version 4 (IPv4) address resources, service providers urgently need to solve the problem of address resource exhaustion. Address Plus Port (A+P) is a practical technology for solving the address exhaustion. Network elements deployed using the A+P can be divided into server-end devices (such as a Provider Edge (PE) router device) and Customer Premise Equipment (CPE).

Typical CPE may include, but is not limited to hardware devices such as a Small Office/Home Office (SOHO) router, a Digital Subscriber Line (DSL) modem gateway, an Internet Protocol Television (IPTV) set top box, a home safety gateway and so on, and certainly, the typical CPE may be embedded to a terminal by serving as a component of software.

Typical server-end devices may include, but are not limited to: a service router, a broadband access server, a firewall, a wireless core gateway namely a Gateway General Packet Radio Service (GPRS) Support Node (GGSN)/ Packet Data Network Gateway (PGW), and the like.

An A+P technology principle is simply introduced below.
The A+P technology principle refers to that:
The server-end device allocates for the CPE an address and a port range resource for the NAT. The port range resource is a public network address and port resource pool for performing an NAT function via the CPE.

Flow from a private network of a user to a WAN needs to be subjected to NAT translation on the CPE. Specifically, a public network address and a port are acquired from the port range resource, a source address and source port of the flow of the private network are translated into the acquired public network address and port, and a mapping table is generated. Due to the fact that messages translated on the CPE may adopt the same public network IP address, it is necessary to perform tunnel encapsulation processing to the flow on the CPE before the flow is forwarded to the server-end device, so as to prevent a conflict when the message is forwarded by an access network. Then, after the server-end device performs de-encapsulation processing, the flow is forwarded to the WAN.

A destination address and a destination port of return flow from the WAN to the user subsequently are the public network address and the public network port translated on the CPE. When reaching the server-end device, the return flow can be forwarded according to the destination address and the destination port in the message. After an encapsulation tunnel is found, the flow can be forwarded to the CPE through the tunnel encapsulation. Tunnel de-encapsulation processing is performed on the CPE, then the destination address and destination port of the flow are translated into a private network address and a private network port according to the generated mapping table, and the address-translated flow is forwarded to a user terminal finally.

In addition, the A+P technology also adopts a core idea of a Carrier Grade NAT (CGN) principle. However, different from a mainstream CGN solution, the A+P technology transfers a CGN function to the CPE of the user. A CGN device is a user access device of the service provider, and it manages a huge number of user mapping table entries and queries the mapping table to perform message translation during forwarding. In this case, the CGN device becomes a bottleneck of user flow forwarding of the service provider. By means of the A+P technology, the CGN device no longer generates the mapping table and performs message translation, so that the running burden on the CGN device is alleviated, so that the CGN device can more easily forward the flow.

However, according to an A+P solution adopted in the related art, the port range resource needs to be allocated to the CPE firstly, and may be allocated via one of the following modes in the related arts which are described in detail as follows.

In a first allocation mode, when the CPE allocates the address according to a Dynamic Host Configuration Protocol (DHCP), the port range resource may be allocated via a DHCP option.

In a second allocation mode, when the CPE performs accessing via a Point to Point Protocol over Ethernet (PPPoE), the port range resource may be allocated via an IP Control Protocol (IPCP) option.

In a third allocation mode, when the CPE allocates the address via a Dynamic Host Configuration Protocol Version 6 (DHCPv6), the port range resource may be allocated via a DHCPv6 option.

A Neighbour Discovery Protocol (NDP) is a key protocol of an Internet Protocol Version 6 (IPv6), and is also an upgrade and improvement of the integration of certain protocols of the IPv4 and the IPv6, such as an Address Resolution Protocol (ARP), Internet Control Message Protocol (ICMP) router discovery and ICMP reorientation. The NDP specifically includes: prefix discovery, neighbour unreachability monitoring, duplication address monitoring, automatic address configuration and the like.

A Neighbour Discovery (ND) message contains an option field which can be filled with one or more options. For example, when automatic address configuration is performed, a Domain Name System (DNS) server address is issued via an ND option. ND also defines some standard options, and private options may also be defined as needed to expand functions of the ND, therefore, it can be seen that the ND has a good expansibility.

In spite of this, when the CPE performs stateless configuration of an IPv6 address via the NDP, there lacks a relevant mechanism for allocating the port range resource.

SUMMARY

The embodiments of the present disclosure provide a method and apparatus for acquiring a port range resource, and a method and apparatus for allocating a port range resource, which are intended to at least solve the problem in the related art that A+P applications cannot be deployed when stateless address configuration of the IPv6 address is performed by adopting the NDP.

According to one aspect of the embodiments of the present disclosure, a method for acquiring a port range resource is provided.

The method for acquiring a port range resource may include that: a first Router Solicitation (RS) message is sent to a server-end device, wherein information carried in the first RS message includes at least one of an IP address multiplexing request and a port range resource allocation request; and a Router Advertisement (RA) message from the server-end device is received, wherein information carried in the RA message includes: a port range resource allocated according to the IP address multiplexing request and/or according to the port range resource allocation request.

Preferably, after the RA message from the server-end device is received, the method may further include that: a second RS message is sent to the server-end device, wherein information carried in the second RS message includes: a port range resource release request which is used for requesting the server-end device to release the port range resource.

Preferably, after the RA message from the server-end device is received, the method may further include that: the port range resource allocated by the server-end device is stored.

Preferably, an expanded ND option may be encapsulated in the first RS message, wherein the ND option contains identification information for requesting to multiplex an IP address resource and/or requesting to allocate the port range resource.

Preferably, an expanded ND option may be encapsulated in the second RS message, wherein the ND option contains identification information for requesting to release the port range resource.

Preferably, an expanded ND option may be encapsulated in the RA message, wherein the ND option contains the allocated port range resource.

Preferably, after the port range resource is stored, the method may further include that: a first flow message triggered by a terminal and sent to a server in a WAN is received; a public network IP address and a public network port are selected from the stored port range resource, a source IP address and a source port, which are currently used by the first flow message, are translated into the public network IP address and the public network port, and a corresponding relationship between the public network IP address and port and the source IP address and port is recorded; and the first flow message is forwarded according to the public network IP address and the public network port.

Preferably, after the first flow message is forwarded according to the public network IP address and the public network port, the method may further include that: a second flow message sent from the server to the terminal is received; the source IP address and port, corresponding to the public network IP address and the public network port which are currently used by the second flow message, are acquired from the corresponding relationship; and the second flow message is forwarded according to the source IP address and the source port.

According to another aspect of the embodiments of the present disclosure, a method for allocating a port range resource is provided.

The method for allocating a port range resource may include that: a first RS message from CPE is received, wherein information carried in the first RS message includes at least one of an IP address multiplexing request and a port range resource allocation request; and a port range resource is allocated according to the IP address multiplexing request and/or according to the port range resource allocation request, the allocated port range resource is encapsulated into an RA message, and the RA message is sent to the CPE.

Preferably, after the RA message is sent to the CPE, the method may further include that: a second RS message from the CPE is received, wherein information carried in the second RS message includes: a port range resource release request; and the port range resource is released according to the port range resource release request.

According to another aspect of the embodiments of the present disclosure, an apparatus for acquiring a port range resource is provided.

The apparatus for acquiring a port range resource may include: a first sending component, configured to send a first RS message to a server-end device, wherein information carried in the first RS message includes at least one of an IP address multiplexing request and a port range resource allocation request; and a receiving component, configured to receive an RA message from the server-end device, wherein information carried in the RA message includes: a port range resource allocated according to the IP address multiplexing request and/or according to the port range resource allocation request.

Preferably, the apparatus may further include: a second sending component, configured to send a second RS message to the server-end device, wherein information carried in the second RS message includes: a port range resource release request which is used for requesting the server-end device to release the port range resource.

According to another aspect of the embodiments of the present disclosure, an apparatus for allocating a port range resource is provided.

The apparatus for allocating a port range resource may include: a first receiving component, configured to receive a first RS message from CPE, wherein information carried in the first RS message includes at least one of an IP address multiplexing request and a port range resource allocation request; and an allocation component, configured to allocate a port range resource according to the IP address multiplexing request and/or according to the port range resource allocation request, encapsulate the allocated port range resource into an RA message, and send the RA message to the CPE.

Preferably, the apparatus may further include: a second receiving component, configured to receive a second RS message from the CPE, wherein information carried in the second RS message includes: a port range resource release request; and a processing component, configured to release the port range resource according to the port range resource release request.

By means of the embodiments of the present disclosure, the first RS message is sent to the server-end device, wherein the information carried in the first RS message includes at least one of the IP address multiplexing request and the port range resource allocation request; and the RA message from the server-end device is received, wherein the information carried in the RA message includes: the port range resource allocated according to the IP address multiplexing request and/or according to the port range resource allocation request. By virtue of the method for acquiring a port range resource and the method for allocating a port range resource in the embodiments of the present disclosure, the stateless address configuration of the IPv6 address is completed by the interaction of the RS messages and the RA message in the NDP, so that the problem in the related art that the A+P applications cannot be deployed when the stateless address configuration of the IPv6 address is performed by adopting the NDP is solved. The A+P technology can be applied to an application scenario where stateless configuration of the IPv6 address is performed via the ND, thereby expanding the application range of the A+P technology.

BRIEF DESCRIPTION OF THE DRAWINGS

The drawings described here are intended to provide further understanding of the embodiments of the present disclosure, and form a part of the present disclosure. The schematic embodiments and descriptions of the present disclosure are intended to explain the present disclosure, and do not form improper limits to the present disclosure. In the drawings.

DETAILED DESCRIPTION OF THE EMBODIMENTS

The present disclosure is described below with reference to the drawings and the embodiments in detail. It is important to note that the embodiments of the present disclosure and the characteristics in the embodiments can be combined under the condition of no conflicts.

Figure 1:
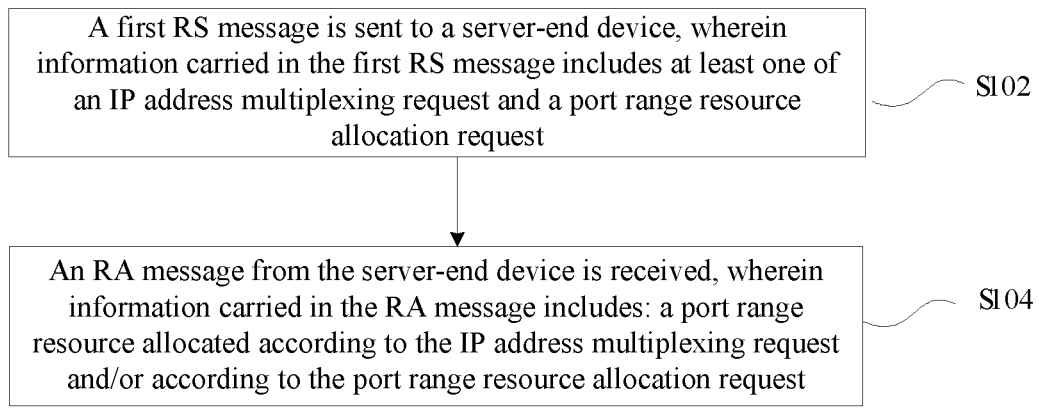
FIG. 1 is a flowchart of a method for acquiring a port range resource according to an embodiment of the present disclosure.

FIG. 1 is a flowchart of a method for acquiring a port range resource according to an embodiment of the present disclosure. As shown in FIG. 1, the method may include the processing steps as follows.

Step S102: A first RS message is sent to a server-end device, wherein information carried in the first RS message includes at least one of an IP address multiplexing request and a port range resource allocation request.

Step S104: An RA message from the server-end device is received, wherein information carried in the RA message includes: a port range resource allocated according to the IP address multiplexing request and/or according to the port range resource allocation request.

In the related art, when stateless address configuration of an IPv6 address is performed by adopting an NDP, A+P applications cannot be deployed. By means of the method shown in FIG. 1, the first RS message is sent to the server-end device (for example, a PE router device), wherein the information carried in the first RS message includes at least one of the IP address multiplexing request and the port range resource allocation request; and the RA message from the server-end device is received, wherein the information carried in the RA message includes: the port range resource allocated according to the IP address multiplexing request and/or according to the port range resource allocation request. In this way, the stateless address configuration of the IPv6 address is completed by the interaction of the RS messages and the RA message in the NDP, so that the problem in the related art that the A+P applications cannot be deployed when the stateless address configuration of the IPv6 address is performed by adopting the NDP is solved, and the A+P technology can be applied to an application scenario where the stateless configuration of the IPv6 address is performed via the ND, thereby expanding the application range of the A+P technology.

Preferably, after the RA message from the server-end device is received in Step S104, the method may further include operations as follows.

Step S1: A second RS message is sent to the server-end device, wherein information carried in the second RS message includes: a port range resource release request which is used for requesting the server-end device to release the port range resource.

Preferably, after the RA message from the server-end device is received in Step S104, the method may further include the step as follows.

Step S2: The port range resource allocated by the server-end device is stored.

Preferably, an expanded ND option is encapsulated in the first RS message, wherein the ND option contains identification information for requesting to multiplex an IP address resource and/or requesting to allocate the port range resource.

Preferably, an expanded ND option is encapsulated in the second RS message, wherein the ND option contains identification information for requesting to release the port range resource.

Preferably, an expanded ND option is encapsulated in the RA message, wherein the ND option contains the allocated port range resource.

Preferably, after the port range resource is stored in Step S2, the method may further include operations as follows.

Step S3: A first flow message triggered by a terminal and sent to a server in a WAN is received.

Step S4: A public network IP address and a public network port are selected from the stored port range resource, a source IP address and a source port, which are currently used by the first flow message, are translated into the public network IP address and the public network port, and a corresponding relationship between the public network IP address and port and the source IP address and port is recorded.

Step S5: The first flow message is forwarded according to the public network IP address and the public network port.

Preferably, after the first flow message is forwarded according to the public network IP address and the public network port in Step S5, the method may further include the steps as follows.

Step S6: A second flow message sent from the server to the terminal is received.

Step S7: The source IP address and port, corresponding to the public network IP address and the public network port which are currently used by the second flow message, are acquired from the corresponding relationship.

Step S8: The second flow message is forwarded according to the source IP address and the source port.

Figure 2:
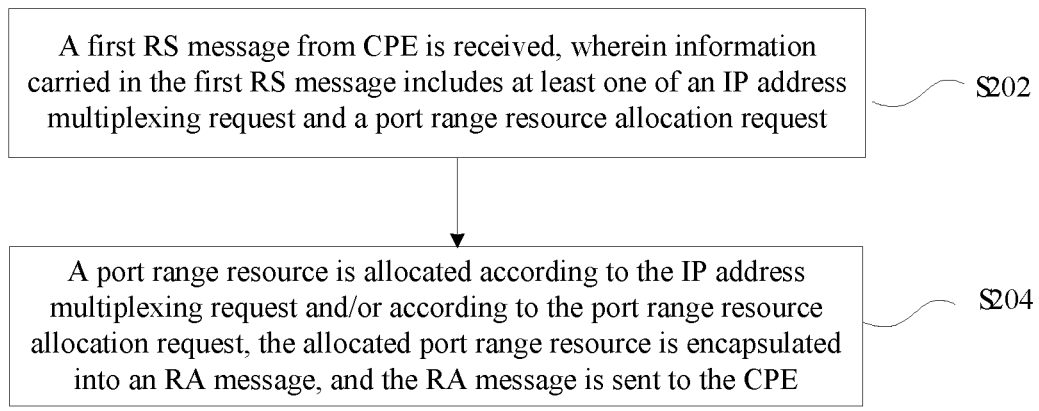
FIG. 2 is a flowchart of a method for allocating a port range resource according to an embodiment of the present disclosure.

FIG. 2 is a flowchart of a method for allocating a port range resource according to an embodiment of the present disclosure. As shown in FIG. 2, the method may include the processing steps as follows.

Step S202: A first RS message from CPE is received, wherein information carried in the first RS message includes at least one of an IP address multiplexing request and a port range resource allocation request.

Step S204: A port range resource is allocated according to the IP address multiplexing request and/or according to the port range resource allocation request, the allocated port range resource is encapsulated into an RA message, and the RA message is sent to the CPE.

By means of the method shown in FIG. 2, the problem in the related art that the A+P applications cannot be deployed when the stateless address configuration of the IPv6 address is performed by adopting the NDP is solved, and the A+P technology can be applied to the application scenario where the stateless configuration of the IPv6 address is performed via the ND, thereby expanding the application range of the A+P technology.

Preferably, after the RA message is sent to the CPE in Step S204, the method may further include operations as follows.

A second RS message from the CPE is received, wherein information carried in the second RS message includes: a port range resource release request; and the port range resource is released according to the port range resource release request.

Figure 3:
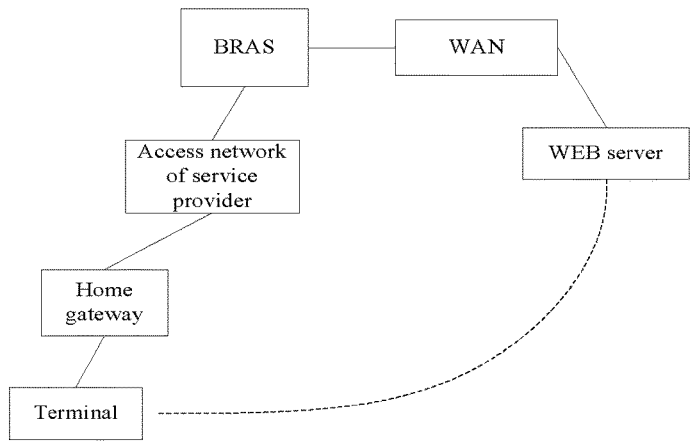
FIG. 3 is a diagram of networking deployment via an A+P technology according to a preferred embodiment of the present disclosure.

FIG. 3 is a diagram of networking deployment via an A+P technology according to a preferred embodiment of the present disclosure. As shown in FIG. 3, in the preferred embodiment, a home gateway is A+P CPE, a Broadband Remote Access Server (BRAS) is an A+P server-end device, and the problem of IPv4 address exhaustion can be solved by using the A+P technology via the CPE and the server-end device. A user network is an IPv4 private network, and an address of the user adopts an IPv4 private address. An access network of the service provider is an IPv6 network, the BRAS performs stateless automatic configuration of the IPv6 address on the CPE via the ND, namely the BRAS allocates the port range resource for the CPE via an ND option, and the CPE performs NAT on the outgoing flow and incoming flow of a user.

Figure 4:
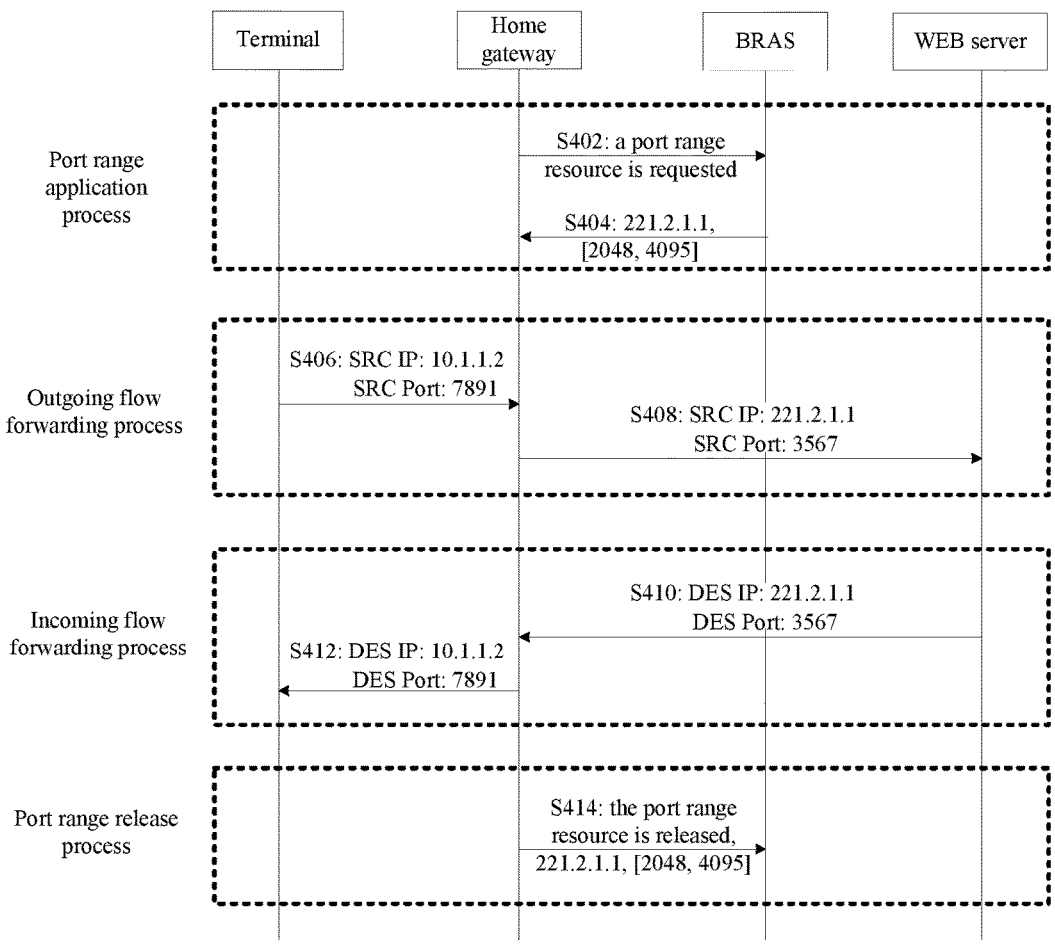
FIG. 4 is an interactive flowchart between all network elements for networking deployment via an A+P technology according to a preferred embodiment of the present disclosure.

FIG. 4 is an interactive flowchart between all network elements for networking deployment via an A+P technology according to a preferred embodiment of the present disclosure. As shown in FIG. 4, the flow may include the processing steps as follows.

(1) A port range resource application process is shown from Step S402 to Step S404 as follows.

Step S402: The home gateway sends an RS message to the BRAS, wherein information carried in the RS message includes at least one of an IP address multiplexing request option and a port range resource request option.

Step S404: The BRAS encapsulates an allocated port range resource (for example, a public network address 221.2.1.1, a port range [2048, 4095]), serving as an option, into an RA message, and then sends the RA message to the home gateway.

(2) An outgoing flow forwarding process is shown from Step S406 to Step S408 as follows.

Step S406: A terminal accesses a WEB server, a source address of a WEB request flow message generated by the terminal is 10.1.1.2, and a source port is 7891. The flow passes through the home gateway, which performs message translation processing, the source address of the flow message is translated into the public network address 221.2.1.1, and the source port is translated into 3567 in the port range. The translated address and port belong to the port range resource allocated for the home gateway by the BRAS. After the home gateway completes message translation processing, a translation mapping table is generated, which specifically is: {10.1.1.2, 7891→221.2.1.1, 3567}.

Step S408: The home gateway forwards the translated message to the WEB server.

(3) An incoming flow forwarding process is shown from Step S410 to Step S412 as follows.

Step S410: The WEB server generates an answer flow message, a destination address of the message is 221.2.1.1, and a destination port is 3567.

Step S412: Incoming flow passes through the home gateway, and the home gateway performs translation processing on the incoming flow message. The home gateway queries the generated mapping table according to the destination address 221.2.1.1 and destination port 3567 of the message, a mapping table entry {10.1.1.2, 7891→221.2.1.1, 3567} is acquired, then the destination address and destination port of the message are translated into a corresponding address 10.1.1.2 and a corresponding port 7891 in the mapping table entry by the home gateway, and finally, the home gateway forwards the translated flow message to the terminal. After the terminal receives the message forwarded by the home gateway, it is discovered that the destination address of the message is a local IP address and the destination port is a locally created monitoring port, and therefore the message is sent to an upper-layer application to be processed accordingly.

(4) A port range release flow is shown in Step S414 as follows.

Step S414: The home gateway sends an RS message to the BRAS, wherein information carried in the RS message includes: a port range resource release request and an option of a port range resource to be released; and after receiving the RS message from the home gateway, the BRAS releases the port range resource.

Figure 5:
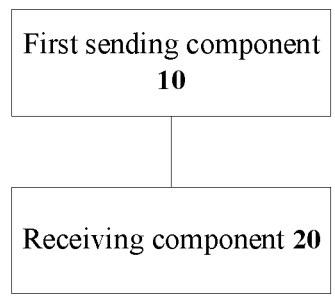
FIG. 5 is a structure block diagram of an apparatus for acquiring a port range resource according to an embodiment of the present disclosure.

FIG. 5 is a structure block diagram of an apparatus for acquiring a port range resource according to an embodiment of the present disclosure. As shown in FIG. 5, the apparatus for acquiring a port range resource may include: a first sending component 10, configured to send a first RS message to a server-end device, wherein information carried in the first RS message includes at least one of an IP address multiplexing request and a port range resource allocation request; and a receiving component 20, configured to receive an RA message from the server-end device, wherein information carried in the RA message includes: a port range resource allocated according to the IP address multiplexing request and/or according to the port range resource allocation request.

By means of the apparatus shown in FIG. 5, the problem in the related art that the A+P applications cannot be deployed when the stateless address configuration of the IPv6 address is performed by adopting the NDP is solved, and the A+P technology can be applied to the application scenario where the stateless configuration of the IPv6 address is performed via the ND, thereby expanding the application range of the A+P technology.

Figure 6:
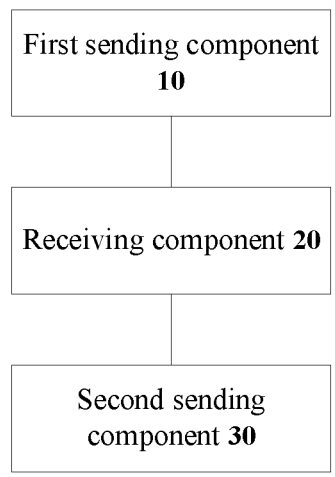
FIG. 6 is a structure block diagram of an apparatus for acquiring a port range resource according to a preferred embodiment of the present disclosure.

Preferably, as shown in FIG. 6, the apparatus may further include: a second sending component 30, configured to send a second RS message to the server-end device, wherein information carried in the second RS message includes: a port range resource release request which is used for requesting the server-end device to release the port range resource.

In a preferred embodiment, the apparatus for acquiring a port range resource is located on CPE, which may include: an ND component, a port range component and an NAT component.

(1) The ND component (equivalent to the first sending component, the receiving component and the second sending component) of the CPE may have, but not limited to, at least one of:

1) a function of sending an RS message to a server-end device, wherein information carried in the RS message includes: a port range allocation request;

2) a function of receiving an RA message from the server-end device, wherein information carried in the RA message includes: a port range resource allocated for the CPE by the server-end device;

3) a function of storing the port range resource allocated by the server-end device to the port range component;

4) a function of sending an RS message to the server-end device, wherein information carried in the RS message includes: a port range release request; and 5) a function of requesting the port range component for release of the port range resource.

(2) The port range component of the CPE may have, but not limited to, at least one of:

1) a function of receiving a port range resource from the ND component and storing the port range resource;

2) a function of receiving a port range resource release request from the ND component and releasing the port range resource; and 3) a function of receiving an IP address and port application request from the ND component and sending the applied IP address and port to the NAT component.

(3) The NAT component of the CPE may have, but not limited to, at least one of:

1) a function of applying the port range component for a public network IP address and a public network port;

2) a function of translating a source IP address and port of the flow, which is from a user network to a WAN, into the applied public network IP address and port, and generating a mapping table; and 3) a function of acquiring the non-translated source IP address and port, corresponding to return flow from the WAN to the user network, from the generated mapping table, and translating a destination address and a destination port into the source IP address and the source port.

Figure 7:
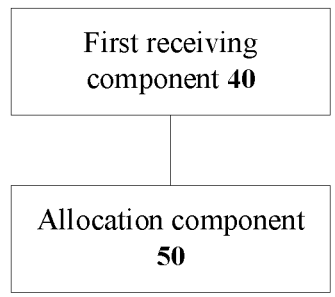
FIG. 7 is a structure block diagram of an apparatus for allocating a port range resource according to an embodiment of the present disclosure.

FIG. 7 is a structure block diagram of an apparatus for allocating a port range resource according to an embodiment of the present disclosure. As shown in FIG. 7, the apparatus for allocating a port range resource may include: a first receiving component 40, configured to receive a first RS message from CPE, wherein information carried in the first RS message includes at least one of an IP address multiplexing request and a port range resource allocation request; and an allocation component 50, configured to allocate a port range resource according to the IP address multiplexing request and/or according to the port range resource allocation request, encapsulate the allocated port range resource into an RA message, and send the RA message to the CPE.

Figure 8:
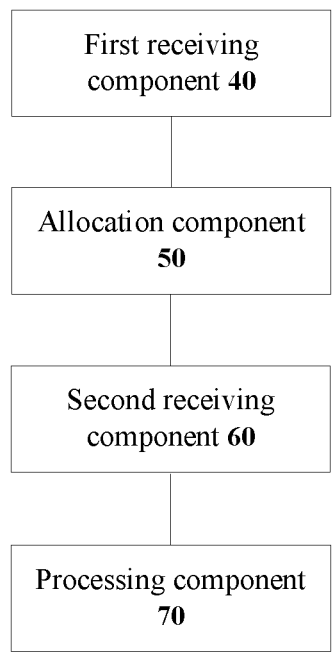
FIG. 8 is a structure block diagram of an apparatus for allocating a port range resource according to a preferred embodiment of the present disclosure.

Preferably, as shown in FIG. 8, the apparatus may further include: a second receiving component 60, configured to receive a second RS message from the CPE, wherein information carried in the second RS message includes: a port range resource release request; and a processing component 70, configured to release the port range resource according to the port range resource release request.

In a preferred embodiment, the apparatus for allocating a port range resource is located on a server-end device, which may include: an ND component and an IP POOL component.

(1) The ND component (equivalent to the first receiving component and the second receiving component) of the server-end device may have, but not limited to, at least one of:

1) a function of receiving an RS message from CPE, wherein if information carried in the RS message includes: a port range resource application request, the IP POOL component will be applied for a port range resource;

2) a function of setting the port range resource as an ND option, encapsulating the ND option into an RA message, and then sending the RA message to the CPE; and 3) a function of receiving an RS message from the CPE, wherein if information carried in the RS message includes: a port range resource release request, the IP POOL component will be requested for release of the port range resource.

(2) The IP POOL component (equivalent to the allocation component) of the server-end device may have, but not limited to, at least one of:

1) a function of receiving a port range resource application request from the ND component, and allocating a port range resource; and 2) a function of receiving a port range resource release request from the ND component, and releasing the port range resource.

In a preferred embodiment, the port range resource request or the port range resource release request carried in the RS message from the ND component may be realized by defining a new ND option, wherein the new ND option may exist in only the RS message. The new ND option may include, but not limited to: an option code, an option length and an option content, wherein the option content is identification information, which may be representative of application or release of the port range resource.

In addition, the port range resource carried in the RA message from the ND component may be similarly realized by defining a new ND option, wherein the new ND option may exist in only the RA message. The new ND option may similarly include: an option code, an option length and an option content, wherein the option content may include: a specifically allocated port range resource.

Figure 9:
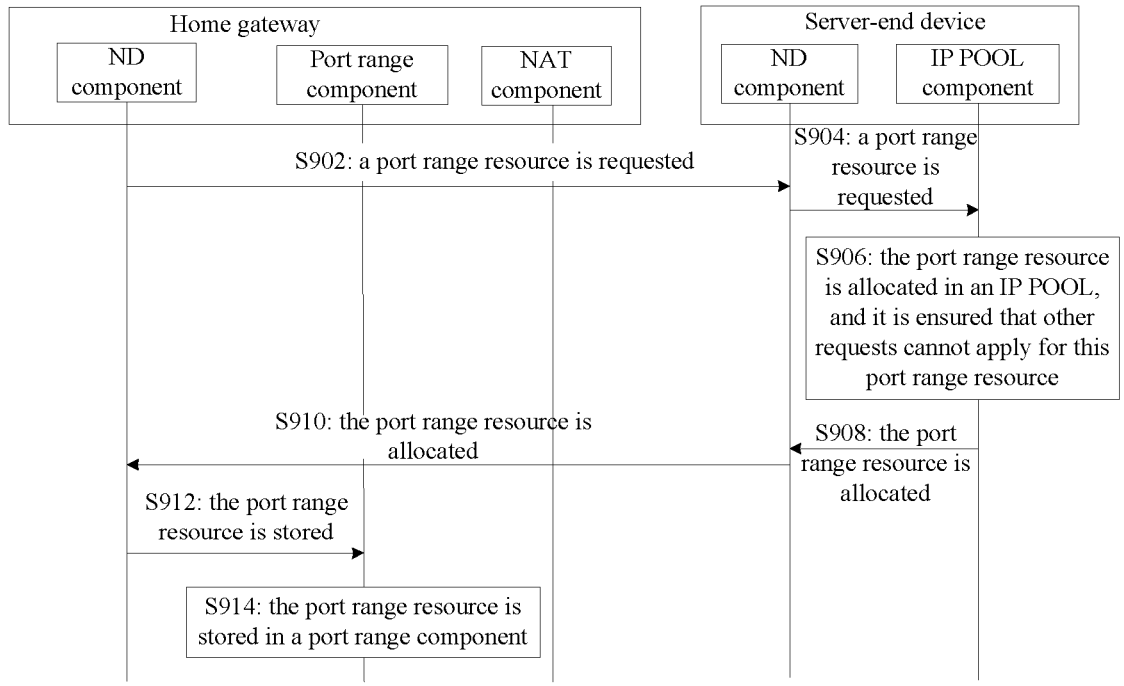
FIG. 9 is an interactive flowchart of allocation of a port range resource for CPE by a server-end device according to a preferred embodiment of the present disclosure.

FIG. 9 is an interactive flowchart of allocation of a port range resource for CPE by a server-end device according to a preferred embodiment of the present disclosure. As shown in FIG. 9, the flow may include the processing steps as follows.

Step S902: The ND component of the CPE sends an RS message to the ND component of the server-end device, wherein information carried in the RS message can include at least one of an IP address multiplexing request and a port range resource request option for requesting a port range resource.

Step S904: After receiving the RS message from the ND component of the CPE, the ND component of the server-end device parses the RS message to discover that the IP address multiplexing request and/or the port range resource request option are carried in the RS message, therefore, the ND component applies for the port range resource from the IP POOL component of the server-end device.

Step S906: The IP POOL component of the server-end device receives the IP address multiplexing request and/or the port range resource request from the ND component of the server-end device, and allocates the port range resource upon receiving the request. In order to be capable of ensuring that the port range resource which has been allocated will be no longer re-allocated for other requests, special identifiers may be set to identify those port range resources which have been allocated.

Step S908: The IP POOL component of the server-end device returns the allocated port range resource to the ND component of the server-end device.

Step S910: The ND component of the server-end device encapsulates the allocated port range resource, serving as an option, into an RA message, and then sends the RA message to the ND component of the CPE.

Step S912: The ND component of the CPE receives the RA message from the ND component of the server-end device, parses the RA message, acquires the port range resource from the option, and then requests the port range component of the CPE for storage of the port range resource which has been allocated.

Step S914: The port range component of the CPE receives a port range resource storage request from the ND component of the CPE and then stores the port range resource to the port range component.

Figure 10:
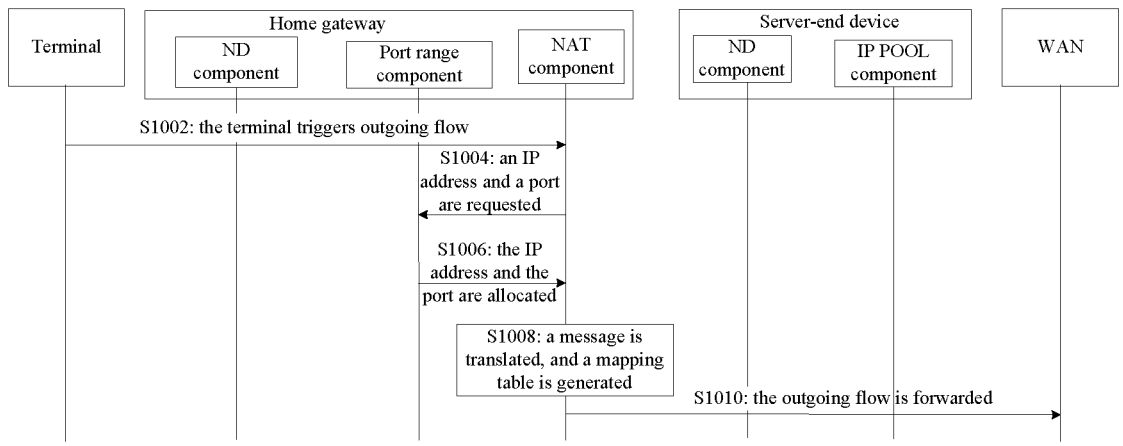
FIG. 10 is a flowchart of translation of outgoing flow (from a user network to a WAN) on CPE according to a preferred embodiment of the present disclosure.

FIG. 10 is a flowchart of translation of outgoing flow (from a user network to a WAN) on CPE according to a preferred embodiment of the present disclosure. As shown in FIG. 10, the flow may include the processing steps as follows.

Step S1002: The terminal triggers outgoing flow to the WAN.

Step S1004: The outgoing flow passes through the NAT component of the CPE, a source address and a source port of a flow message are translated into a public network address and a public network port, and at this time, the public network IP address and the public network port are applied from the port range component.

Step S1006: The port range component of the CPE allocates the public network IP address and the public network port for the NAT component of the CPE, wherein the IP address is an IP address in the port range resource which has been allocated for the CPE by the server-end device, and the port is a port in the port range resource which has been allocated for the CPE by the server-end device.

Step S1008: The NAT component of the CPE translates the flow message by using the public network address and the public network port allocated by the port range component of the CPE, and then translates a source address and a source port of the message into the public network address and the public network port, and generates a mapping table.

Step S1010: The NAT component of the CPE forwards the translated outgoing flow to the WAN.

Figure 11:
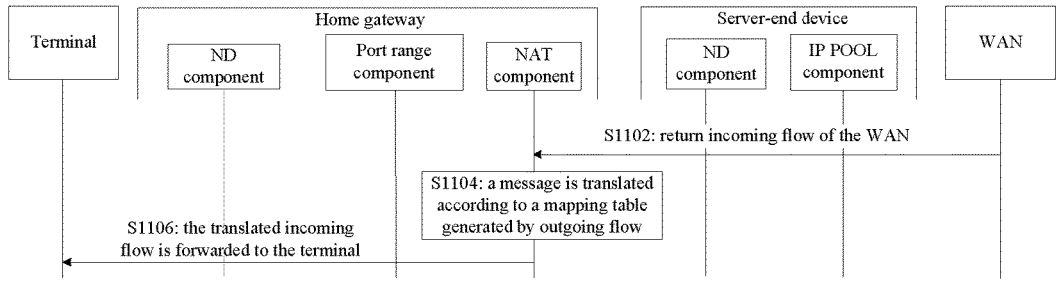
FIG. 11 is a flowchart of translation of incoming flow (from a WAN to a user network) on CPE according to a preferred embodiment of the present disclosure.

FIG. 11 is a flowchart of translation of incoming flow (from a WAN to a user network) on CPE according to a preferred embodiment of the present disclosure. As shown in FIG. 11, the flow may include the processing steps as follows.

Step S1102: The NAT component of the CPE receives return incoming flow from the WAN to the terminal in the user network.

Step S1104: The NAT component of the CPE translates a destination address and a destination port of an incoming flow message into a private network address and a private network port of the user network according to a mapping entry generated when handling the outgoing flow.

Step S1106: The NAT component of the CPE forwards the translated incoming flow to the terminal.

Figure 12:
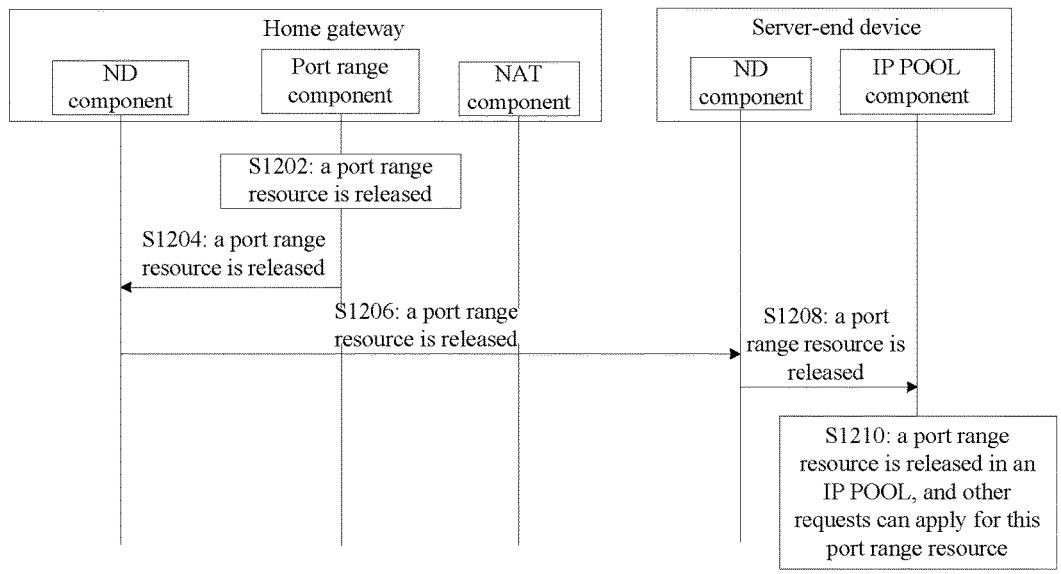
FIG. 12 is an interactive flowchart of release of a port range resource by CPE according to a preferred embodiment of the present disclosure.

FIG. 12 is an interactive flowchart of release of a port range resource by CPE according to a preferred embodiment of the present disclosure. As shown in FIG. 12, the flow may include the processing steps as follows.

Step S1202: The port range component of the CPE may release a port range resource, and this release may be triggered by means of, but not limited to, at least one of the following manners:

(1) the release process is triggered by a management interface user;

(2) the release process is triggered by address release of the CPE; and (3) the release process is triggered by outgoing-direction faults of the CPE.

Step S1204: The port range component of the CPE requests the ND component of the CPE for release of the port range resource.

Step S1206: The ND component of the CPE sends an RS message, wherein a port range resource release request, serving as an option, is encapsulated in the RS message.

Step S1208: The ND component of the server-end device receives the RS message from the ND component of the CPE, parses the RS message, acquires the port range resource release request, and then requests the IP POOL component of the server-end device for release of the port range resource.

Step S1210: The IP POOL component of the server-end device receives the port range resource release request from the ND component of the server-end device, and further releases the port range resource, and then the port range resource may be allocated for other port range resource requests.

It is important to note that due to the fact that an encapsulation function and a de-encapsulation function of A+P and an A+P forwarding function on the server-end device are standard functions of the A+P technology, these contents are not emphatically focused in the embodiments of the present disclosure, so detailed descriptions are unnecessary.

From the abovementioned descriptions, it can be seen that the embodiments achieve the following technical effects (it is important to note that these effects are effects which can be achieved by certain preferred embodiments): by means of the technical solution provided in the embodiments of the present disclosure, the A+P technology can be applied to the application scenario where the stateless configuration of the IPv6 address is performed via the ND, thereby expanding the application range of the A+P technology.

Obviously, those skilled in the art should understand that all components or all steps in the present disclosure can be realized by using a generic computation apparatus, can be centralized on a single computation apparatus or can be distributed on a network composed of a plurality of computation apparatuses. Optionally, they can be realized by using executable program codes of the computation apparatuses, so that they can be stored in a storage apparatus and executed by the computation apparatuses, the shown or described steps can be executed in a sequence different from this sequence under certain conditions, or they are manufactured into each integrated circuit component respectively, or a plurality of components or steps therein are manufactured into a single integrated circuit component. Thus, the present disclosure is not limited to combination of any specific hardware and software.

The above is only the preferred embodiments of the present disclosure, and is not intended to limit the present disclosure. There can be various modifications and variations in the present disclosure for those skilled in the art. Any modifications, equivalent replacements, improvements and the like within the principle of the present disclosure shall fall within the protection scope defined by the appended claims of the present disclosure.

What is claimed is:

1. A method for acquiring a port range resource, comprising:
    sending a first Router Solicitation (RS) message to a server-end device, wherein information carried in the first RS message comprises at least one of an Internet Protocol (IP) address multiplexing request and a port range resource allocation request; and
    receiving a Router Advertisement (RA) message from the server-end device, wherein information carried in the RA message comprises: a port range resource allocated according to the IP address multiplexing request and/or according to the port range resource allocation request;
    wherein after the RA message from the server-end device is received, the method further comprises: storing the port range resource allocated by the server-end device;
    wherein after the port range resource is stored, the method further comprises: receiving a first flow message triggered by a terminal and sent to a server in a Wide Area Network (WAN); selecting a public network IP address and a public network port from the stored port range resource, translating a source IP address and a source port, which are currently used by the first flow message, into the public network IP address and the public network port, and recording a corresponding relationship between the public network IP address and port and the source IP address and port; and forwarding the first flow message according to the public network IP address and the public network port.

2. The method as claimed in claim 1, wherein after the RA message from the server-end device is received, the method further comprises:
    sending a second RS message to the server-end device, wherein information carried in the second RS message comprises: a port range resource release request which is used for requesting the server-end device to release the port range resource.

3. The method as claimed in claim 1, wherein an expanded Neighbour Discovery (ND) option is encapsulated in the first RS message, and the ND option contains identification information for requesting to multiplex an IP address resource and/or requesting to allocate the port range resource.

4. The method as claimed in claim 2, wherein an expanded ND option is encapsulated in the second RS message, and the ND option contains identification information for requesting to release the port range resource.

5. The method as claimed in claim 1, wherein an expanded ND option is encapsulated in the RA message, and the ND option contains the allocated port range resource.

6. The method as claimed in claim 1, wherein after the first flow message is forwarded according to the public network IP address and the public network port, the method further comprises:
    receiving a second flow message sent from the server to the terminal;
    acquiring the source IP address and port, corresponding to the public network IP address and the public network port which are currently used by the second flow message, from the corresponding relationship; and
    forwarding the second flow message according to the source IP address and the source port.

7. A method for allocating a port range resource, comprising:
    receiving a first Router Solicitation (RS) message from Customer Premise Equipment (CPE), wherein information carried in the first RS message comprises at least one of an Internet Protocol (IP) address multiplexing request and a port range resource allocation request; and
    allocating a port range resource according to the IP address multiplexing request and/or according to the port range resource allocation request, encapsulating the allocated port range resource into a Router Advertisement (RA) message, and sending the RA message to the CPE;
    wherein the method further comprises: after the port range resource is stored, receiving a first flow message triggered by a terminal and sent to a server in a Wide Area Network (WAN); selecting a public network IP address and a public network port from the stored port range resource, translating a source IP address and a source port, which are currently used by the first flow message, into the public network IP address and the public network port, recording a corresponding relationship between the public network IP address and port and the source IP address and port; and forwarding the first flow message according to the public network IP address and the public network port.

8. The method as claimed in claim 7, wherein after the RA message is sent to the CPE, the method further comprises:
    receiving a second RS message from the CPE, wherein information carried in the second RS message comprises: a port range resource release request; and
    releasing the port range resource according to the port range resource release request.

9. An apparatus for acquiring a port range resource, wherein the apparatus comprises: a hardware processor, configured to perform programming components stored in a memory, wherein the programming components comprise:
    a first sending component, configured to send a first Router Solicitation (RS) message to a server-end device, wherein information carried in the first RS message comprises at least one of an Internet Protocol (IP) address multiplexing request and a port range resource allocation request; and
    a receiving component, configured to receive a Router Advertisement (RA) message from the server-end device, wherein information carried in the RA message comprises: a port range resource allocated according to the IP address multiplexing request and/or according to the port range resource allocation request;
    wherein after the RA message from the server-end device is received, the programming components are further configured to execute following steps: receiving a first flow message triggered by a terminal and sent to a server in a Wide Area Network (WAN); selecting a public network IP address and a public network port from the stored port range resource, translating a source IP address and a source port, which are currently used by the first flow message, into the public network IP address and the public network port, recording a corresponding relationship between the public network IP address and port and the source IP address and port; and forwarding the first flow message according to the public network IP address and the public network port.

10. The apparatus as claimed in claim 9, wherein the programming components comprise:
a second sending component, configured to send a second RS message to the server-end device, wherein information carried in the second RS message comprises: a port range resource release request which is used for requesting the server-end device to release the port range resource.

11. An apparatus for allocating a port range resource, wherein the apparatus comprises: a hardware processor, configured to perform programming components stored in a memory, wherein the programming components comprise:
a first receiving component, configured to receive a first Router Solicitation (RS) message from Customer Premise Equipment (CPE), wherein information carried in the first RS message comprises at least one of an Internet Protocol (IP) address multiplexing request and a port range resource allocation request; and
an allocation component, configured to allocate a port range resource according to the IP address multiplexing request and/or according to the port range resource allocation request, encapsulate the allocated port range resource into a Router Advertisement (RA) message, and send the RA message to the CPE;
wherein after the CPE stores the port range resource, the CPE is further configured to execute following steps: receiving a first flow message triggered by a terminal and sent to a server in a Wide Area Network (WAN); selecting a public network IP address and a public network port from the stored port range resource, translating a source IP address and a source port, which are currently used by the first flow message, into the public network IP address and the public network port, recording a corresponding relationship between the public network IP address and port and the source IP address and port; and forwarding the first flow message according to the public network IP address and the public network port.

12. The apparatus as claimed in claim 11, further comprises:
a second receiving component, configured to receive a second RS message from the CPE, wherein information carried in the second RS message comprises: a port range resource release request; and
a processing component, configured to release the port range resource according to the port range resource release request.

* * * * *